US006642287B2

(12) United States Patent
Syed et al.

(10) Patent No.: US 6,642,287 B2
(45) Date of Patent: Nov. 4, 2003

(54) METHYL PROPYL KETONE PEROXIDE FORMULATIONS AND THEIR USE IN PROCESSES TO CURE UNSATURATED POLYESTER RESINS

(75) Inventors: Ejaz Ahmed Syed, Deventer (NL); Bernhard Vries, Nunspeet (NL); Frederik Willem Karel Koers, Epse (NL)

(73) Assignee: AKZO Nobel N.V., Arnhem (NL)

( * ) Notice: Subject to any disclaimer, the term of this patent is extended or adjusted under 35 U.S.C. 154(b) by 12 days.

(21) Appl. No.: 10/026,260

(22) Filed: Dec. 21, 2001

(65) Prior Publication Data

US 2002/0137972 A1 Sep. 26, 2002

Related U.S. Application Data

(60) Provisional application No. 60/258,650, filed on Dec. 29, 2000.

(30) Foreign Application Priority Data

Mar. 30, 2001 (EP) .............................. 01201233

(51) Int. Cl.[7] .......................... C08L 67/06; C08K 5/10; C08K 5/14
(52) U.S. Cl. .......................... 523/511; 525/13; 525/14; 525/17; 525/27; 252/186.26; 252/186.42
(58) Field of Search .............................. 525/27, 13, 14, 525/17; 252/186.26, 186.42; 523/511

(56) References Cited

U.S. PATENT DOCUMENTS 3,003,000 A * 10/1961 Milas .......................... 568/562
3,151,170 A  9/1964 Davis et al. ................. 260/610
3,288,861 A  11/1966 Higashiuchi ................. 260/610
3,560,395 A  2/1971 Westbrook, Jr. ............. 252/186
3,649,546 A  3/1972 McCloskey et al. ......... 252/186
4,052,465 A  10/1977 Roskott et al. ........... 260/610 R
5,235,010 A  8/1993 Giovando .................... 526/113
5,907,022 A  5/1999 Stigter et al. ................ 526/228

FOREIGN PATENT DOCUMENTS

| EP | 209 181 A3 | 1/1987 | ....... C07C/179/087 |
| EP | 209 181 A2 | 1/1987 | ....... C07C/179/087 |
| EP | 570 213 A2 | 11/1993 | ........... C08G/63/91 |
| GB | 2 000 497 | 1/1979 | ......... C07C/179/02 |
| JP | 10-087652 | 4/1998 | ......... C07D/323/00 |
| WO | WO 96/03397 | 2/1996 | ......... C07D/323/00 |
| WO | WO 98/33770 | 8/1998 | ......... C07C/409/00 |
| WO | WO 99/32442 | 7/1999 | ......... C07C/407/00 |

OTHER PUBLICATIONS

Derwent Abstract 128:258089 (1999) abstracting JP 10–087652.

* cited by examiner

*Primary Examiner*—Patricia A. Short
(74) *Attorney, Agent, or Firm*—Richard P. Fennelly

(57) ABSTRACT

Methyl propyl ketone peroxide formulations are claimed that can be safely handled at ambient temperature, are storage stable, and give fast curing rates of unsaturated polyester resins particularly when accelerated with a complex of two different metals. The claimed products are particularly suited for thin articles and coating such as suited for use in gel coat systems. The pure ketone peroxides consist of more than 60% by weight of type-4 methyl propyl ketone peroxide and used as formulations containing sufficient amount of a non-aqueous phlegmatizer.

11 Claims, No Drawings

METHYL PROPYL KETONE PEROXIDE FORMULATIONS AND THEIR USE IN PROCESSES TO CURE UNSATURATED POLYESTER RESINS

This application claims priority from U.S. Provisional Patent Application Ser. No. 60/258,650, filed Dec. 29, 2000 and from European Patent Application Serial No. 01201233.2, filed Mar. 30, 2001.

The invention relates to formulations comprising methyl propyl ketone peroxide and the use of methyl propyl ketone peroxide-containing formulations in the process to cure unsaturated polyester resins.

Ketone peroxides and their use as curing agents for unsaturated polyester resins also have long been known. A ketone peroxide is a reaction product of a ketone and hydrogen peroxide and usually is a mixture of products with different structure types. The so-called type-3 and type-4 structures (see below) are most stable and are therefore predominantly present. Most of the ketone peroxides in pure form are hazardous and they need to be phlegmatized to a degree where they are safe to handle and transport, typically at ambient temperature, as mentioned in, for instance, U.S. Pat. No. 3,649,546. The degree of phlegmatization or, in other words, the amount of a phlegmatizer needed, is dependent on the type of ketone peroxide, type of phlegmatizer and the relative weight of the various ketone peroxide types. It has been tried to influence the ratio of the compounds in equilibrium in such a manner that a relatively safe mixture of compounds is formed, one that needs little phlegmatization. U.S. Pat. No. 3,560,395, for example, discloses how to make aqueous methyl ethyl ketone peroxide compositions containing just hydrogen peroxide, a ketone peroxide of formula:

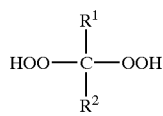

(a so-called type-4 ketone peroxide), and water, which is safe at concentrations of more than 10% active oxygen and gives fast curing of water extended polyester resins. The production and the generic use of predominantly type-4 ethyl amyl ketone peroxide was disclosed in U.S. Pat. No. 3,151,170. This document does not disclose that other types of ketone peroxides solve many of the problems depicted above. U.S. Pat. No. 4,052,465 discloses the use of ketone peroxides consisting essentially of compounds of the formula:

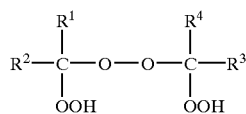

(so-called type-3 ketone peroxides) for the curing of vinyl or vinylidene group-containing polyester resins.

JP-A-10087652 discloses the use of a ketone peroxide composition comprising 13–43% by weight of the type-3 product and 3–22% by weight of the type-4 product. When used to cure unsaturated polyester resins, the compounds are said to give a long gel time and slow cure. Safety properties of peroxides are not discussed. However, such formulations were found not to be safe and the cure of the UP was found to be too slow. Typically, the ketone peroxides exemplified are derived from methyl ethyl ketone and use is made of conventional accelerators, such as Co-octoate.

However, the methyl ethyl ketone peroxides disclosed in the examples of these references show insufficient performance in the curing of gel coats, being thin layers (up to 2 mm in thickness) of unsaturated polyester resin. More specifically, an undesired and very long gel time is observed, resulting in, inter alia, too high styrene emission. Gelation and cure speed can be increased by using higher amounts of peroxide and/or by introduction of cobalt salts, such as cobalt octoate. However, in the conventional systems this leads to unacceptable discoloration of the gel coats. Also, conventional fast curing systems tend to lead to foaming in vinylester resins, which is undesired. Slow cure is a disadvantage in most of the other applications of unsaturated polyester resins too. Moreover, some of the ketone peroxide formulations of the prior art that contain a large amount of type-3 ketone peroxide are not safe. Furthermore, the use of aqueous compositions, as proposed by the prior art, is unacceptable in many applications since i) conventional Co-based accelerators hydrolyze in such systems, leading to unsatisfactory cure characteristics, and ii) aqueous formulations tend to result in undesired foam formation. Hence, there is a clear need for improved ketone peroxide compositions which should give fast cure, do not lead to the hydrolysis of Co-based accelerators, give low discoloration, give no foaming of vinylester resins, and at the same time are safe during transport, storage, and handling, preferably at ambient temperatures.

Surprisingly, we have found that specific ketone peroxide formulations that are derived from methyl propyl ketone and comprise a high amount of type-4 ketone peroxide can be produced safely, especially when use is made of an effective amount of particular (co)solvents, and that the use of these products gives desirable fast curing rates of unsaturated polyester resins, especially in gel coat applications, and that a low level of residual monomer is obtained. Moreover, the products according to the invention can be stored and handled safely at ambient temperatures and solve most, if not all of the other problems.

Accordingly, we claim methyl propyl ketone peroxide formulations comprising: more than 60%, preferably more than 65, more preferably more than 67%, most preferably more than 70% by weight of type-4 methyl propyl ketone peroxide up to 100%, preferably 99, more preferably 98%, most preferably 95% by weight of type-4 methyl propyl ketone peroxide, and preferably comprising, less than 40%, preferably less than 35%, most preferably less than 30%, and preferably more than 1%, more preferably more than 2%, most preferably more than 5% by weight of type-3 methyl propyl ketone peroxide (calculated as the amount of active oxygen of the specified type ketone peroxide based on the total active oxygen of all methyl propyl ketone peroxides in the formulation) and a non-aqueous phlegmatizer in an amount such that the Self Accelerating Decomposition Test (SADT), Dutch Pressure Vessel Test (DPVT) and the Koenen test show safe handling and transport at temperatures of 0–50° C., preferably at temperatures of 10–45° C., most preferably at ambient temperatures of 20–40° C. More preferably, the amount of phlegmatizer is chosen such that the self accelerating decomposition temperature as determined by the SADT is 50° C. or higher, the limiting diameter as determined by the DPVT is <3.5 mm, and the limiting diameter as determined by the Koenen test is 1.0 mm. The tests are of the conventional type as mentioned in the UN Recommendations on the Transport of Dangerous Goods, 11$^{th}$ edition (ST/SG/AC.10/1/Rev.11)

Preferably, the final methyl propyl ketone peroxide formulation contains more than 10%, preferably more than 15%, more preferably more than 20, and most preferably more than 25% by weight of type-4 peroxide, based on the weight of the total formulation. Preferably, the amount of type-3 ketone peroxide in the formulations according to the invention is less than 13% by weight, based on the weight of the total formulation. It is noted that the amount of active oxygen associated with each of the peroxidic components is determined in the conventional way known in the art and that hydrogen peroxide is not a ketone peroxide. Furthermore it is noted that the term methyl propyl ketone peroxide includes peroxides derived from methyl isopropyl ketone and/or methyl n-propyl ketone. Preferred are the methyl isopropyl ketone-derived peroxide formulations.

The final methyl propyl ketone peroxide formulations may contain (residual) hydrogen peroxide. It was observed that in certain curing processes of unsaturated peroxides the speed of gelation was increased due to the presence of $H_2O_2$. However, in some instances, such as when vinylester resins are cured, the presence of $H_2O_2$ is undesirable as it gives foaming. Therefore, depending on the use of the formulations, it can be preferred to have from 0.001 to 5% by weight (% w/w) of hydrogen peroxide (based on the weight of the active oxygen of the hydrogen peroxide over the weight of the total active oxygen of the formulation) in the formulation.

Phlegmatizers that can be used in these formulations are of the conventional type and are preferably selected from alkanols, cycloalkanols, alkylene glycols, alkylene glycol monoalkyl ethers, cyclic ether substituted alcohols, cyclic amides, esters, ketones (preferably other than the ketone that is used to make the ketone peroxide being phlegmatized), aromatic solvents, halogenated hydrocarbon solvents, and mixtures thereof.

Examples of hydrophilic esters include, but are not limited to, monocarboxylic esters of mono- and dihydric alcohols, esters of dicarboxylic acids and monohydric alcohols, carbonates of monohydric alcohols, alkoxyalkyl esters, β-keto esters, phthalates, phosphates, benzoates, adipates, and citrates. More specific examples of esters useful in most of the compositions of the present invention are dimethyl phthalate, diethyl phthalate, dibenzyl phthalate, butyl benzyl phthalate, diallyl phthalate, isopentyl acetate, benzyl acetate, methyl benzoate, ethyl benzoate, isopropyl benzoate, diethylene glycol dibenzoate, dipropylene glycol dibenzoate, propylene glycol dibenzoate, n-butyl pivalate, isoamyl pivalate, sec-amyl pivalate, diethyl adipate, dioctyl adipate, methyl neodecanoate, n-butyl neodecanoate, propylene glycol diacetate, ethylene glycol diacetate, neopentyl acetate, methyl-2-ethythexanoate, isoamyl propionate, sec-amyl propionate, benzyl propionate, butyl caproate, ethylene glycol dipropionate, heptyl propionate, methyl phenyl acetate, propyl caprylate, triethyl phosphate, tricresyl phosphate, trixylyl phosphate, dimethyl methyl phosphonate, chlorinated phosphate esters, tributyl phosphate, tributoxyethyl phosphate, methyl decanoate, dimethyl succinate, diethyl succinate, dimethyl malonate, diethyl malonate, methyl ethyl succinate, diisobutyl nylonate, 2,2,4-trimethyl-1,3-pentanediol-diisobutyrate (also known as TXIB), diethyl oxalate, dimethyl fumarate, diethyl fumarate, dipropyl fumarate, dibutyl fumarate, acetyl tributyl citrate, and diesters of maleic anhydride, such as dibutyl maleate.

Preferred useful hydrocarbon solvents include, but are not limited to, benzene, toluene, ethylbenzene, xylene (o, m, p, or mixtures thereof), mesithylene, o-diisopropyl benzene, m-diisopropyl benzene, p-diisopropyl benzene, and mixtures thereof. More preferred hydrocarbon solvents include Solvesso® 100, Solvesso 150, Solvesso 200, halogenated versions of these compounds, such as p-dibromobenzene, 5-bromo-m-xylene, and 1,2,3-trichlorobenzene, and mixtures of two or more of any of the compounds. Most preferred are aromatic solvents, since these show the best solubility for MPKP formulations with a high type-4 content.

Useful halogenated hydrocarbons include 3-bromo-o-xylene, 4-bromo-o-xylene, 2-bromo-m-xylene, 4-bromo-m-xylene, 5-bromo-m-xylene, o-dibromobenzene, p-dibromobenzene, tetrabromoethylene, 1,2,3-trichlorobenzene, 1,2,4-trichlorobenzene, and mixtures thereof.

Examples of ketone as solvents are 4,4-dimethyl 4-hydroxy-2-pentanone, disobutylketone and diisopropyl ketones.

Examples of cyclic amides include 2-pyrrolidone, N-methyl pyrrolidone, 1,5-dimethyl-2-pyrrolidone, and 3,3-dimethyl-2-pyrrolidone.

Examples of useful alcohols are n-butyl alcohol, capryl alcohol, tetrahydrofurfuryl alcohol, 1,4-dihydroxymethyl cyclohexane, ethylene glycol, diethylene glycol, polyethylene glycols, propylene glycol, dipropylene glycol, neopentyl glycol, hexylene glycol, 1,4-butylene glycol, 2,3-butylene glycol, butene diol, 1,5-pentane diol, 2,2,4,4-tetramethyl-1,3-cyclobutane diol, ethylene glycol monoethyl ether, ethylene glycol monobutyl ether, diethylene glycol monoethyl ether, diethylene glycol monobutyl ether, tetrahydrofuran and diacetone alcohol.

Soluble solid or waxy materials that can be employed in the compositions of the present invention include polyethylene glycol, polypropylene glycol, polytetrahydrofuran, and polycaprolactone.

Preferred methyl propyl ketone peroxide (MPKP) formulations according to the invention comprise a phlegmatizer selected from the group consisting of dimethyl phthalate, and 2,2,4-trimethyl-1,3-pentanediol-diisobutyrate. However, other phlegmatizers selected from one or more of the compounds given above may be used as a co-phlegmatizer in the preferred methyl propyl ketone peroxide formulations. When a co-phlegmatizer is used, preferably at least 1% by weight, more preferably at least 10% by weight of all phlegmatizer is of the preferred type. The use of one or more of these two phlegmatizers allows the production of safe MPKP formulations with high active oxygen levels which are stable during storage (no change in the ratio type-3:type-4 product is observed) and which give very good curing of unsaturated polyester resins.

It is noted that U.S. Pat. No. 5,907,022 discloses, in a comparative example, how to make a pure type-3 ketone peroxide based on methyl isopropyl ketone. However, neither safe, stable, and technical mixtures comprising type-3 and type-4 ketone peroxide nor the use of such products in unsaturated curing processes is disclosed or suggested.

The curing process of the present invention comprises the addition of an MPKP formulation according to the invention to one or more conventional resins and/or pre-polymers, and preferably at least one accelerator, followed by mixing and dispensing. The curing process is preferably carried out at ambient temperatures commonly used in applications such as hand lay-up, spray, and coating. However, it can also be used in SMC, BMC, pulltrusion techniques, and the like. Due to the high reactivity of the MPKP formulations according to the invention they are particularly suitable for curing (at ambient temperature) of a thin articles of up to 2 mm in thickness and coating, especially gel coats. The amount of the MPKP formulation that is to be used in the curing process ranges from 0.1 to 8% by weight based on resin, but preferably from 0.5 to 5%, most preferably from 1 to 2%.

The resin or pre-polymer is preferably chosen from the group consisting of conventional unsaturated polyesters, including so-called ortho resins, iso-resins, iso-npg resins, and dichloro pentadiene resins. Examples of such resins are maleic, allylic, vinylic, and epoxy-type materials, combined with at least one ethylenically unsaturated reactive monomer. Preferred ethylenically unsaturated reactive monomers include styrene and styrene derivatives such as α-methylstyrene, indene, divinyl benzene, stilbene, dibenzalacetone, propenyl benzene, and isopropenyl benzene; triallyl cyanurate, triallyl isocyanurate, and mixtures thereof. The amount of ethylenically unsaturated reactive monomer is from 0 to 50% by weight (% w/w), based on the weight of the resin.

Preferred optional accelerators are selected from the group consisting of conventional salts, preferably cobalt salts, of one or more carboxylic acids with one or more of the metals and complexes of two metals selected from lithium, copper, manganese, magnesium, vanadium, iron, and cobalt, with an oxygenated compound, such as an aldehyde, ketone, ether, ester, or alcohol. More particularly, the oxygenated compound of the complexes is preferably selected from keto- and aldo-esters and ethers or alcohols, in particular methyl acetoacetate, ethyl acetoacetate, mono- and diesters of ketoglutaric acid, pyruvates, sugars such as glucose and fructose; and esters of ascorbic acid such as ascorbic palmitate; 1,3-diketones and aldehydes, in particular acetyl acetone, benzoyl acetone, and dibenzoyl methane; mono- and diesters, more in particular diethyl malonate and succinates; 1,2-diketones, in particular diacetyl and glyoxal; and certain polyalcohols and other alcohols such as diethylene glycol, benzyl alcohol, and alcohols of the fatty series, as disclosed in U.S. Pat. No. 5,235,010. In the process of the present invention, the accelerator is generally employed in a conventional amount. Amounts of 0.1 to 5% by weight, preferably 0.25 to 2.0% by weight, based on the weight of the resin, are typically used.

Other optional additives may be employed in the curing process according to the invention, such as fillers, glass fibres, pigments, inhibitors, promoters, and stabilizers.

In the curing process of the present invention, typically the resin is first mixed with the ethylenically unsaturated reactive monomer. The optional accelerator composition may be added in several different manners and may have been pre-mixed with the monomer or resin. The MPKP formulation may be added directly to the mixture. However, it can also be first mixed with the monomer or resin. Care is to be taken that the MPKP formulation and the accelerator are not pre-mixed, since this can be hazardous.

The curing process of the present invention is preferably carried out at ambient temperature, but depending on the technique being used, temperatures up to 150° C., more preferably up to 50° C., can be used.

The invention is elucidated by means of the following examples:

EXAMPLE 1

Methyl isopropyl ketone and hydrogen peroxide were reacted using a mineral acid as a catalyst in the presence of sufficient phlegmatizer, dimethyl phthalate (DMP), to have a total active oxygen level in the composition of 7% by weight. The type-4 to type-3 ratio (on an active oxygen basis) was 67 to 33.

Methyl isopropyl ketone peroxide formulation (MIPKP) with this type-4 to type-3 ratio and an active oxygen concentration greater than 7% by weight were found not to fulfill the UN requirements for products to be handled and transported at ambient temperatures.

Comparative Example Z

Example 1 was repeated except that diisobutyl phthalate was used instead of DMP and that the amount of acid was increased. The product contained 40% w/w of type-4 product and 60% w/w of type-3 product, based on the weight of total methyl isopropyl ketone peroxides in the formulation, and did not contain any other ketone peroxides.

The peroxides of examples 1 and Z and were compared for their efficiency in an iso gel coat, Crystic 65PA ex Scott Bader. The iso gel coat resin was accelerated with 0.25% cobalt octate solution (Accelerator NL51P containing 6% cobalt ex Akzo Nobel). Properties measured were gel time, time to lamination and hardness on 400 micron dry film. The table below shows that MIPKP with lower type 4/type 3 shows longer gel time and slow hardness built-up. This shows that higher type 4 to type 3 ratio is desired to achieve desirable fast cure peroxides.

| Product | MIPKP of Example 1 | MIPKP of Example Z |
|---|---|---|
| Type 4/type 3 MIPKP | 67/33 | 40/60 |
| Gel time, min | 13 | 30 |
| Time to lamination | 35 | 50 |
| Persoz hardness | | |
| After 2 hours | 44 | 29 |
| After 4 hours | 72 | 47 |
| After 6 hours | 93 | 67 |

Gel time is the time from the mixing of peroxide with gel coat till the mixture gels and not flow anymore.

Time to lamination is the time from the start of the mixing till the gel coat layer is still tacky but upon touching no gel coat transfers to a glove. This is the time when the laminate can be applied onto the gel coat layer. Therefore, it is desirable to have a short time to lamination in order to increase the productivity. Persoz hardness was measured according to method ISO-DR-1522.

EXAMPLE 3

In this example methyl n-propyl ketone was reacted with hydrogen peroxide in DMP in the same way as mentioned in example 1. The product, MnPKP had an active oxygen content of 7% and the type-4 to type-3 ratio was 65 to 35.

EXAMPLE 4

Example 1 was repeated except that TXIB (trimethyl 1,3-pentanediol diisobutyrate) was used instead of DMP and in a lower amount. The product was found to be safe up to an active oxygen concentration of 8.5% by weight. The formed MIPKP of 8.5% AO had a type-4 to type-3 ratio of 70 to 30 (and was phthalate free).

On the basis of the results, it is considered that preferred MPKP formulations of the invention preferably have a type-4: other ketone peroxides ratio of from 1.5 to 4. Preferably, it is 1.70 to 3.5, more preferably 2 to 3. The ratio is expressed as the weight of the active oxygen of the type-4 product over the weight of active oxygen of all other ketone peroxides in the formulation. Also, the phlegmatizers evaluated are preferred, since they are economical and useful in obtaining desirable MPKP formulations. Furthermore, all the methyl propyl ketone peroxide formulations were storage stable at room temperature for a period of up to 3 months and could, surprisingly, also be safely handled and transported at room temperature, as shown by the SADT, the DPVT and the Koenen test (documented as UN test E.1 for the Koenen test and UN test E.2 for the DPVT in the "United Nations Recommendations on the Transport of Dangerous Goods, Manual of Tests and Criteria, ST/SG/AC.10/11/Rev.2," United Nations, New York and Geneva, 1995).

EXAMPLES 5–7

Comparative Examples A and B

In a conventional gel coat recipe methyl ethyl ketone peroxide (MEKP) and MIPKP were compared. The curing systems contained 100 parts by weight (pbw) of iso-65 resin (Crystic ISO 65GC ex Scott Bader), 0.25 pbw of a Co-octoate solution (containing 6% Co-octoate), and 2 pbw of a ketone peroxide formulation. The formulations and results are given in the following table:

| Example | A<br>Bx. M50 | B<br>Cad. M50 | 5<br>MIPKP | 6<br>MIPKP | 7<br>MnPKP |
|---|---|---|---|---|---|
| AO, % | 9 | 9 | 7 | 8.5 | 7 |
| Phlegmatizer | DMP | TXIB | DMP | TXIB | DMP |
| MEKP (Butanox M50) | 2 | — | — | — | |
| MEKP (Cadox M50) | — | 2 | — | — | |
| MIPKP (example 1) | — | — | 2 | | |
| MIPKP (example 4) | — | — | — | 2 | |
| MnPKP (example 3) | | | | | 2 |
| 400 micron dry film | | | | | |
| Gel time, min | 15 | 23 | 15 | 11 | 16 |
| Time to Lamination, min | 50 | 53 | 40 | 30 | 45 |
| Persoz Hardness | | | | | |
| 2 hrs | 21 | 18 | 26 | 34 | 22 |
| 4 hrs | 41 | 35 | 53 | 60 | 45 |
| 6 hrs | 58 | 46 | 68 | 75 | 62 |
| 24 hrs | 120 | 106 | 129 | 132 | 120 |

So, clearly, the MPKP formulations according to the invention give a shorter time to lamination and fast cure (as measured by hardness build up), which is desirable to achieve fast production, despite the fact that a higher oxygen concentration was used in the comparative examples.

EXAMPLES 8 AND 9

Comparative Example C

The product of examples 1 and 4 were compared with conventional methyl ethyl ketone peroxide using a technique wherein a gelcoat is sprayed (allowing fast production). The curing systems contained 100 parts by weight (pbw) of iso-resin (Palatal® A400 ex. DSM-BASF), 0.25 pbw of an accelerator composition containing cobalt and copper in accordance with U.S. Pat. No. 5,235,010, supplied as Accelerator R553 by Akzo Nobel, and 2 pbw of a ketone peroxide formulation. The formulations and results are given in the following table:

| Example | C<br>Butanox M50<br>(MEKP) | 8<br>MIPKP<br>(example 1) | 9<br>MIPKP<br>(example 4) |
|---|---|---|---|
| 400 micron dry film | | | |
| Gel time, min | 13 | 8 | 6 |
| Time to lamination, min | 35 | 24 | 19 |
| Persoz hardness | | | |
| after 2 hours | 22 | 36 | 40 |
| after 4 hours | 40 | 56 | 61 |

Clearly, the MIPKP gives better reactivity, especially with respect to gel time and time to lamination, when accelerated with a product like R553.

EXAMPLES 10 AND 11

Comparative Examples D–F

Example 5 was repeated, except that 0.3 pbw of the Co-octoate-containing solution was used. The ketone peroxide formulations that were used, and the results obtained are given in the following table. It is noted that the product of Example D consisted essentially of type-3 MIPKP and corresponds to Composition G in U.S. Pat. No. 5,907,022.

Gel time measurement of various peroxides

| Example | D | E | 10 | 11 | F |
|---|---|---|---|---|---|
| Ketone peroxide | MIBKP | MIPKP | MIPKP | MIPKP | Bx.LPT |
| AO, % | 8.9 | 9 | 7 | 8.5 | 8.9 |
| solvent | DBP | Solvesso | DMP | TXIB | DIBP |
| MEKP (Butanox M50) | 2 | — | — | — | — |
| MEKP (Cadox M50) | — | 2 | — | — | — |
| MIPKP (example 1) | — | — | 2 | — | — |
| MIPKP (example 4) | — | — | — | 2 | — |
| MEKP Bx. LPT) | | | | | 2 |
| Gel time, min | 32 | 103 | 10 | 8 | 28 |

MIBKP = methyl isobutyl ketone peroxide, Trigonox HM ex. Akzo Nobel
Bx. LPT = MEKP in accordance with NOF JP-A-10087652
DBP = dibutyl phthalate Clearly, the MPKP peroxide formulations of the invention outperform the conventional ketone peroxide formulations.

EXAMPLES 12 AND 13

Comparative Examples G AND H

In these examples a laminate with a thickness of 4 mm was made. A conventional Ortho UP resin (Ludapal® P6 ex. BASF/DSM) in an amount of 100 pbw was combined with 0.5 pbw of a Co-octoate solution (containing 1% cobalt by weight), 2 pbw of a ketone peroxide formulation, and glass fibre in such an amount that the total mixture contained 35% by weight of said glass fibre. The gelation time at 20° C., the time at which the curing heat peak was observed (time to peak), the maximum temperature recorded ($T_p$), and the Barcol Hardness (measured in the conventional way) were determined after 2, 4, 6, and 24 hours. Accordingly, Barcol meter was placed onto the horizontal surface of laminate and pressed manually so that the indenter of the meter penetrates the surface and the hardness is directly read on the meter. Barcol meter number 934 is used for hard surfaces and number 935 is used for soft surfaces.

In Examples 12 and 13 an MPKP formulation of Examples 1 and 4 was used, respectively. In Examples G and H a conventional MEKP formulation, supplied as Butanox® M50 ex Akzo Nobel (DMP being the phlegmatizer) and Cadox® M50 ex Akzo Nobel (TXIB being the phlegmatizer), respectively, each with an active oxygen content of 9% by weight, was used. The results are given in the table below:

| Ex. | Gel time (min) | Time to peak (min) | $T_p$ (° C.) | Barcol hardness after (hours) (meter 934) | | | |
|---|---|---|---|---|---|---|---|
| | | | | 2 | 4 | 6 | 24 |
| 12 | 14 | 30 | 57 | 29 | 37 | 38 | 40 |
| 13 | 13.5 | 28 | 72 | 43 | 43 | 43 | 44 |
| G | 16.5 | 35 | 40 | soft | 12 | 15 | 37 |
| H | 18.7 | 37 | 40 | soft | soft | 10 | 30 |

Clearly, the products according to the invention give a superior performance, viz. a short time to peak and fast cure in terms of hardness development, while the exotherm is not too high.

EXAMPLES 14 AND 15

Comparative Examples I and J

The product of examples 1 was compared with conventional methyl ethyl ketone peroxide using a technique wherein a vinylester resin was cured. The curing systems contained 100 parts by weight (pbw) of vinylester resin (Derakane 411 ex. Dow Chemicals), 0.25 pbw of an accelerator composition, and 2 pbw of a ketone peroxide formulation. The formulations and results are given in the following table:

| Example | 14 | 15 | I | J |
|---|---|---|---|---|
| Ketone peroxide | MIPKP (example 1) | MIPKP (example 1) | Butanox M50 (MEKP) | Butanox M50 (MEKP) |
| Accelerator | NL51P | R-553 | NL51P | R-553 |
| Gel time, min | 18 | 14 | 30 | 24 |
| Foaming | yes | no | yes | no |

Clearly, the MIPKP gives better reactivity than the conventional ketone peroxide. Also it is shown that in vinylester resin the use of a combination of MIPKP and accelerators such as R-553 is particularly advantageous since not only is a fast curing observed, it also does not lead to undesired foam formation. Non-foaming is observed in the MEKP system as well, but at a much reduced reactivity.

What is claimed is:

1. Methyl propyl ketone peroxide formulations comprising more than 60% by weight of type-4 methyl propyl ketone peroxide (calculated as the weight of active oxygen of the type-4 methyl propyl ketone peroxide over the weight of the total active oxygen of all methyl propyl ketone peroxides), more than 1% by weight of type-3 methyl propyl ketone peroxide (calculated as the weight of active oxygen of the type-3 methyl propyl ketone peroxide over the weight of total active oxygen of all methyl propyl ketone peroxides) and a non-aqueous phlegmatizer in an amount such that the Pressure Vessel Test and the Koenen test show safe handling and transport at temperatures of 0–50° C.

2. Methyl propyl ketone peroxide formulations according to claim 1 that contain a phlegmatizer in such an amount that they can be safely handled and transported at temperatures of 10–45° C.

3. Methyl propyl ketone peroxide formulations of claim 1 wherein the phlegmatizer comprises dimethyl phthalate or trimethyl-1,3-pentanediol diisobutyrate.

4. Methyl propyl ketone peroxide formulations of claim 1 comprising 10–75% by weight of type-4 peroxide, based on the weight of the total formulation.

5. Methyl propyl ketone peroxide formulations according to any one of claims 1–4 wherein the methyl propyl ketone peroxide is derived from methyl isopropyl ketone.

6. Methyl propyl ketone peroxide formulations according to any one of claims 1–4 comprising up to 5% by weight of hydrogen peroxide.

7. A process to cure an unsaturated polyester resin wherein a methyl propyl ketone peroxide formulation according to any one of claims 1–4 is added to the resin.

8. A process according to claim 7 wherein a metal accelerator is added to the resin.

9. A process according to claim 8 wherein at least two metal accelerators are used.

10. A process according to claim 7 wherein a thin article is cured.

11. A process according to claim 10 wherein the thin article is a gel coat.

* * * * *